(12) United States Patent
Ikeya et al.

(10) Patent No.: US 9,698,391 B2
(45) Date of Patent: Jul. 4, 2017

(54) POWER STORAGE DEVICE

(71) Applicant: HONDA MOTOR CO., LTD., Tokyo (JP)

(72) Inventors: Tsubasa Ikeya, Wako (JP); Jun Machida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 13/869,027

(22) Filed: Apr. 24, 2013

(65) Prior Publication Data
US 2013/0323576 A1    Dec. 5, 2013

(30) Foreign Application Priority Data

May 31, 2012  (JP) ................. 2012-124848

(51) Int. Cl.
| H01M 2/10 | (2006.01) |
| H01G 15/00 | (2013.01) |
| H01M 8/2475 | (2016.01) |
| H01G 9/26 | (2006.01) |
| H01G 11/12 | (2013.01) |
| H01G 11/76 | (2013.01) |

(52) U.S. Cl.
CPC ............ *H01M 2/1077* (2013.01); *H01G 9/26* (2013.01); *H01G 11/12* (2013.01); *H01G 11/76* (2013.01); *H01G 15/00* (2013.01); *H01M 8/2475* (2013.01); *H01M 2220/20* (2013.01); *Y02E 60/13* (2013.01); *Y02T 10/7022* (2013.01)

(58) Field of Classification Search
CPC .......................... H01M 8/2475; H01M 2/1077
See application file for complete search history.

(56) References Cited

U.S. PATENT DOCUMENTS

2005/0019643 A1* 1/2005 Sugita ................. H01M 8/0258
                                                      429/470
2009/0239136 A1* 9/2009 Nagamine ........... H01M 2/1077
                                                      429/148

FOREIGN PATENT DOCUMENTS

JP    2010-272520    12/2010

* cited by examiner

*Primary Examiner* — Ladan Mohaddes
(74) *Attorney, Agent, or Firm* — Mori & Ward, LLP

(57) ABSTRACT

A power storage device includes a plurality of power storage modules, a first connecting plate, and a second connecting plate. Each of the plurality of power storage modules includes a plurality of power storage cells, a first end plate, and a second end plate. The first end plate includes a first main plate and a first sub-plate. The first sub-plate includes a first securing hole. The first main plate and the first sub-plate are provided to be connected to each other in at least two positional relationships with different positions of the first securing hole. The first connecting plate includes a first reference securing hole aligned with the first securing hole. The first securing hole is secured to the first reference securing hole by a first securing member.

8 Claims, 8 Drawing Sheets

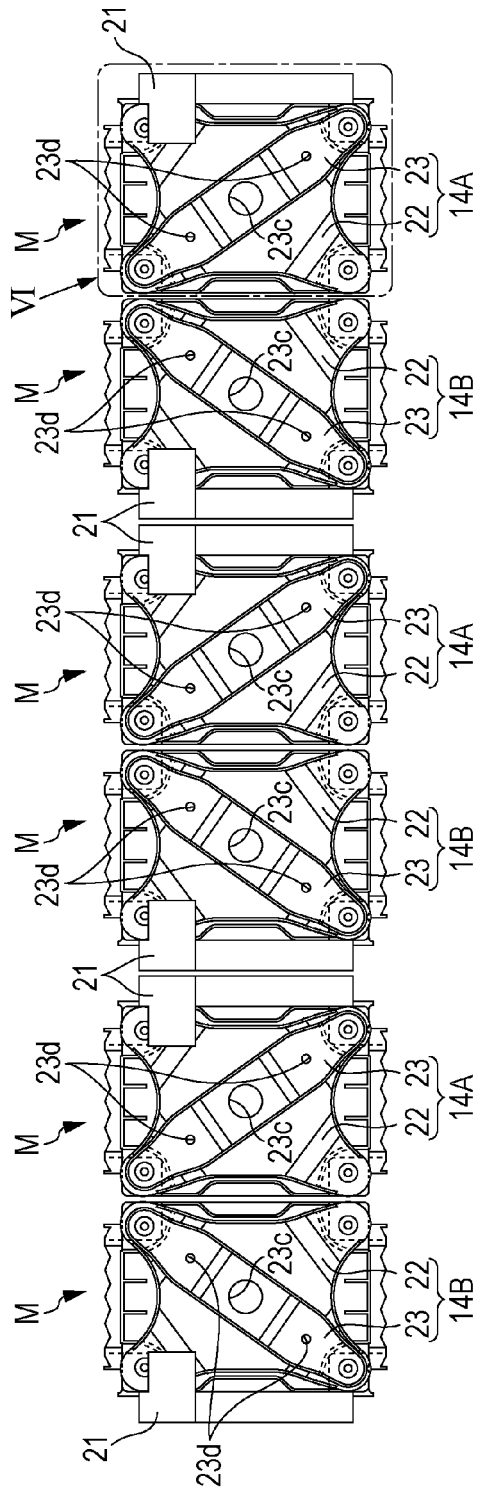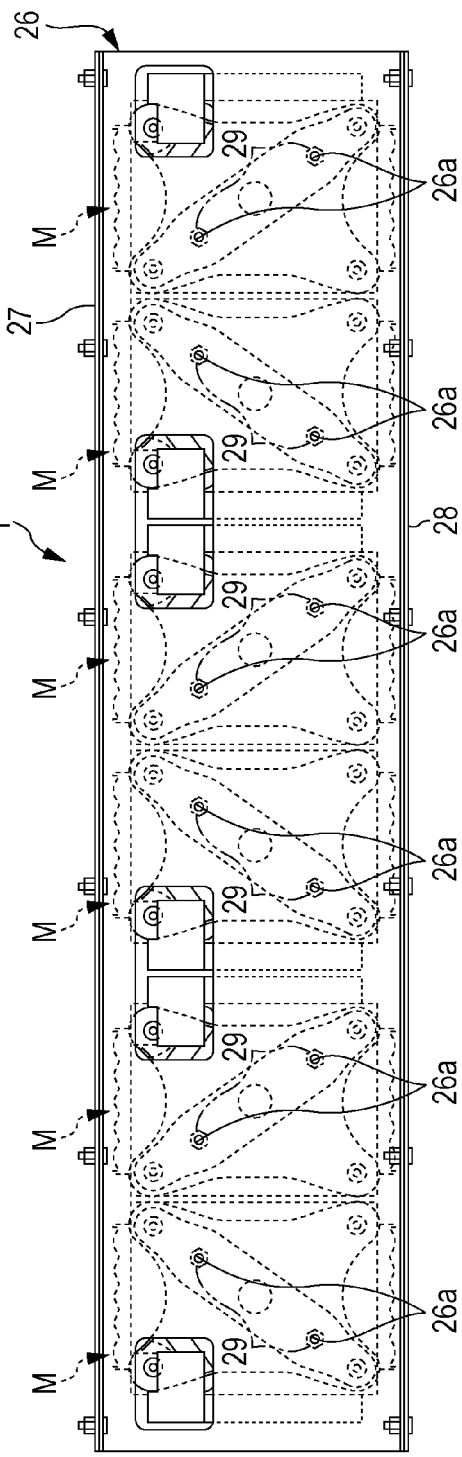

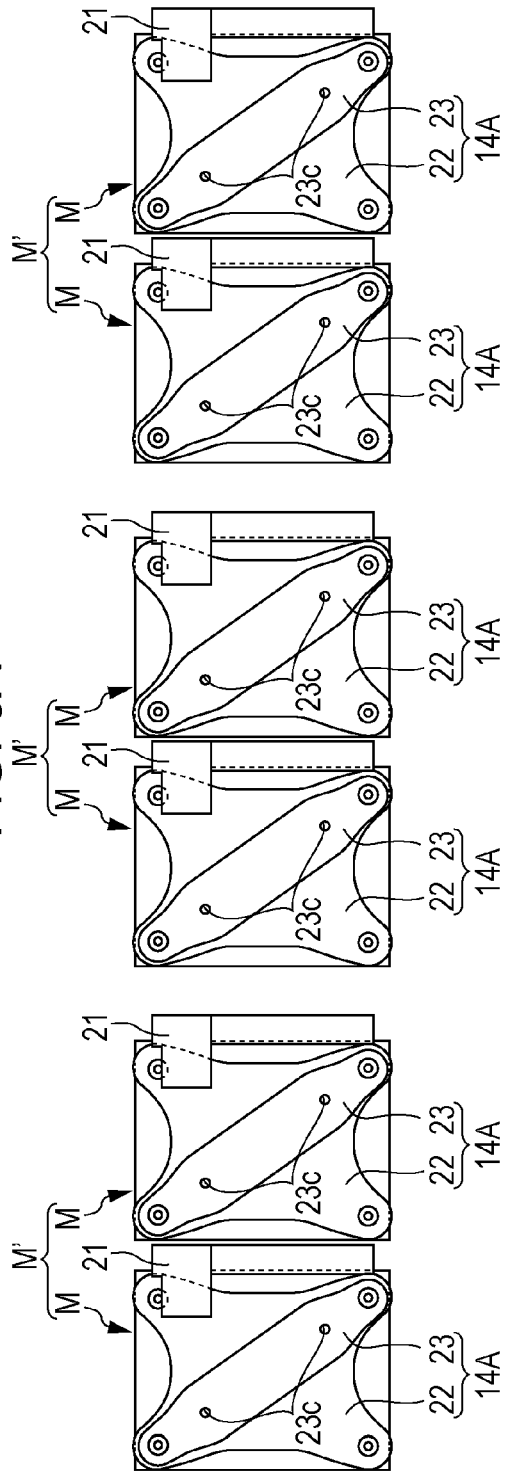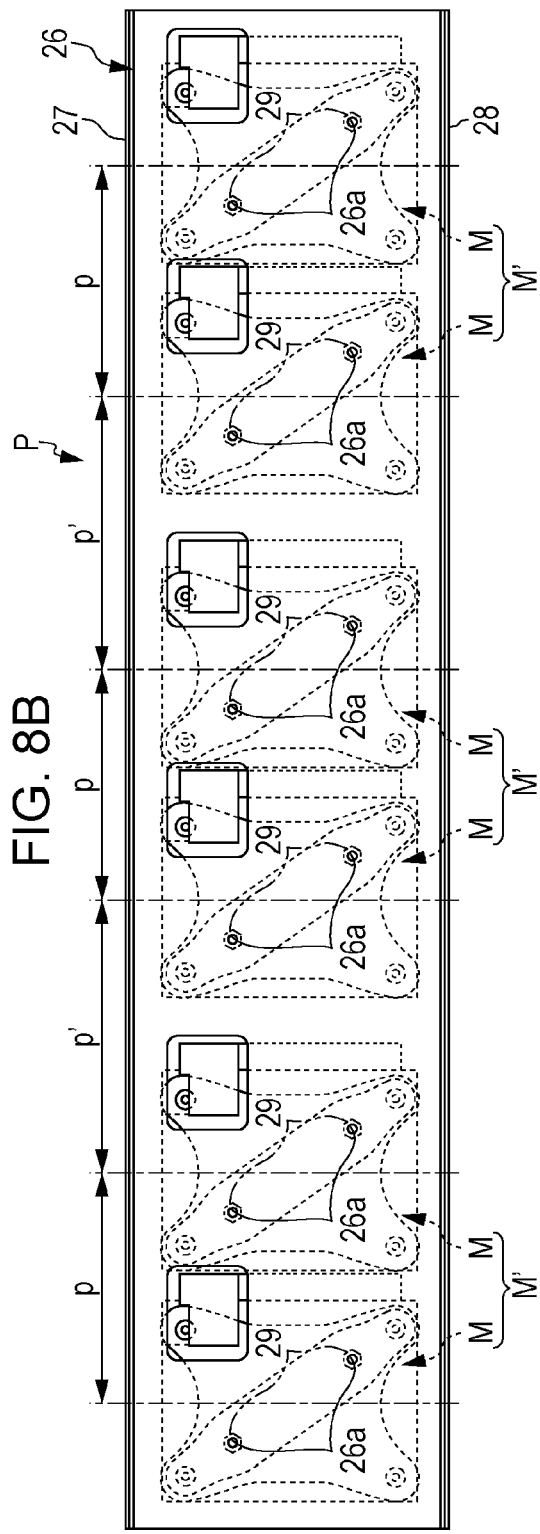

US 9,698,391 B2
// 1

POWER STORAGE DEVICE

CROSS-REFERENCE TO RELATED APPLICATIONS

The present application claims priority under 35 U.S.C. §119 to Japanese Patent Application No. 2012-124848, filed May 31, 2012, entitled "Power Storage Device." The contents of this application are incorporated herein by reference in their entirety.

BACKGROUND OF THE INVENTION

Field of the Invention

The present disclosure relates to a power storage device.

Discussion of the Background

Japanese Unexamined Patent Application Publication No. 2010-272520 discloses a technology in which a power storage module is formed by integrally securing with a stack member a plurality of stacked power storage cells and a pair of end plates which are stacked outwardly of the power storage cells, and the lower end of a pair of reinforcing members is fixed on a pair of supporting plates via a pin (bolt), the reinforcing members being stacked outwardly of the pair of end plates of the power storage module in the stacking direction.

SUMMARY OF THE INVENTION

According to one aspect of the present invention, a power storage device includes a plurality of power storage modules, a first connecting plate, and a second connecting plate. Each of the plurality of power storage modules includes a plurality of power storage cells, a first end plate, and a second end plate. The plurality of power storage cells are stacked in a stacking direction. The first end plate is provided at a first side of the power storage cells in the stacking direction. The first end plate includes a first main plate and a first sub-plate. The first main plate faces the first side of the power storage cells. The first sub-plate includes a first securing hole. The first main plate and the first sub-plate are provided to be connected to each other in at least two positional relationships with different positions of the first securing hole. The second end plate is provided at a second side of the power storage cells in the stacking direction. The second end plate includes a second main plate and a second sub-plate. The second main plate faces the second side of the power storage cells. The second sub-plate includes a second securing hole. The first connecting plate includes a first reference securing hole aligned with the first securing hole. The first securing hole is secured to the first reference securing hole by a first securing member. The first sub-plate faces the first connecting plate. The second connecting plate includes a second securing hole aligned with the second reference securing hole. The second securing hole is secured to the second reference securing hole by a second securing member. The power storage modules are provided between the first connecting plate and the second connecting plate. The second sub-plate faces the second connecting plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 5A and 5B are respective views in both directions of an arrow V in FIG. 4 in the first embodiment.

FIGS. 8A and 8B are views in the second embodiment, which respectively correspond to FIGS. 5A and 5B in the first embodiment.

DESCRIPTION OF THE EMBODIMENTS

Figure 1:
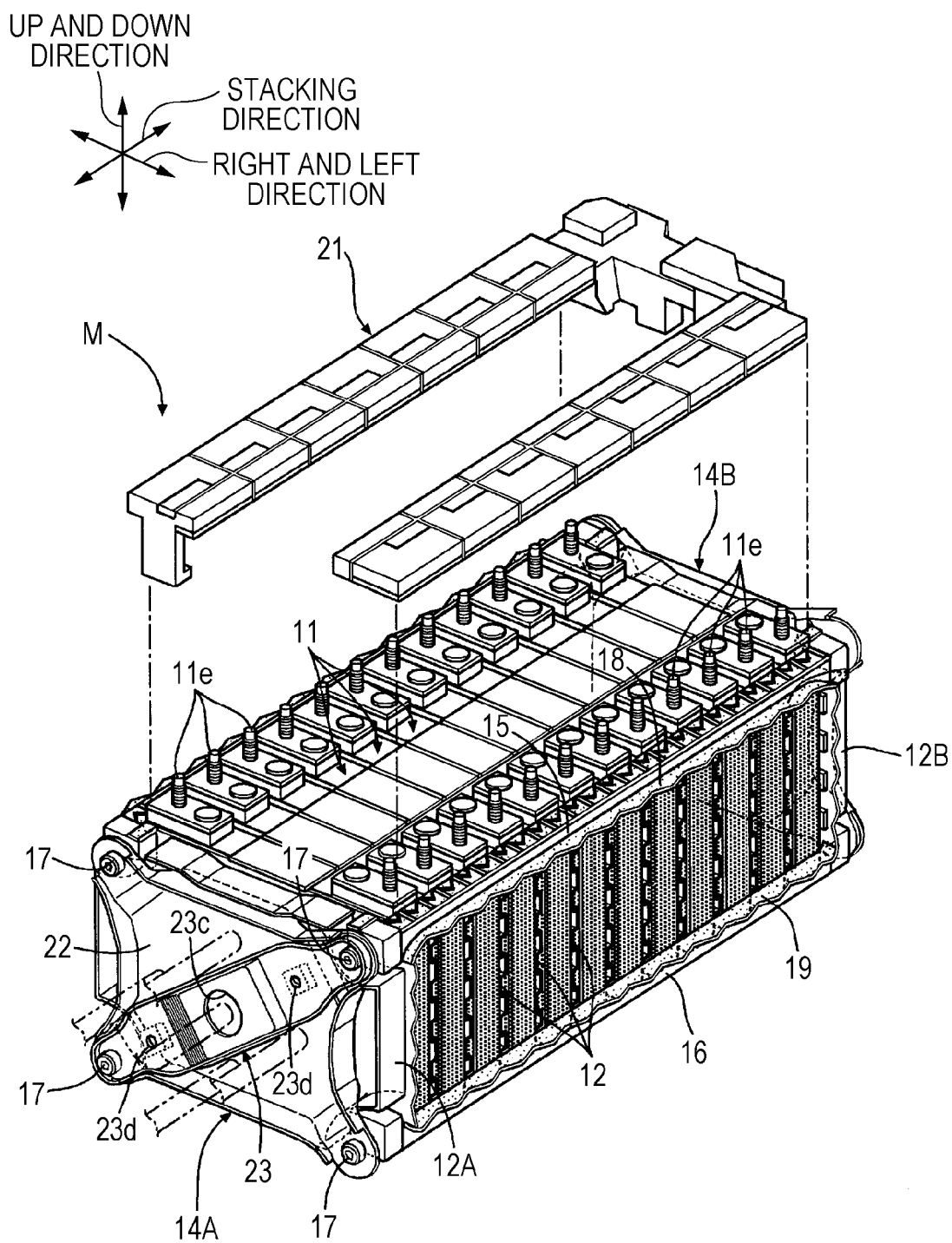
FIG. 1 is a perspective view of a power storage module according to a first embodiment.

The embodiments will now be described with reference to the accompanying drawings, wherein like reference numerals designate corresponding or identical elements throughout the various drawings.

First Embodiment

Hereinafter, a first embodiment of the present disclosure will be described with reference to FIGS. 1 to 7.

Figure 2:
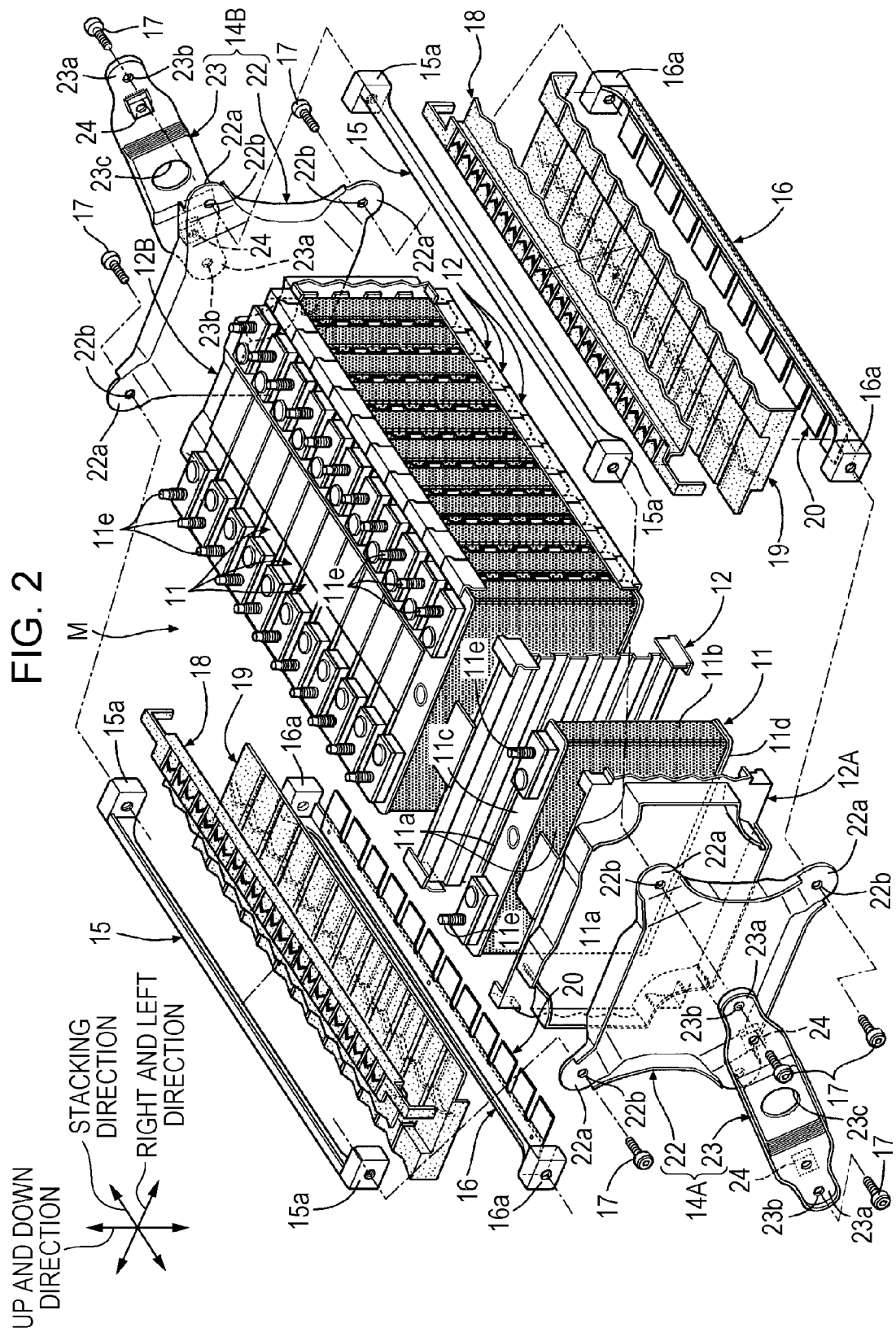
FIG. 2 is an exploded perspective view of the power storage module according to the first embodiment.

As illustrated in FIGS. 1 and 2, a power storage module M, which is used as a power supply device for an electric vehicle or a hybrid vehicle, includes a predetermined number (12 in the first embodiment) of power storage cells 11 which are stacked in a stacking direction. Each power storage cell 11 is formed in a rectangular prism shape, and includes a pair of major surfaces 11a, 11a opposed to each other, a pair of lateral surfaces 11b, 11b which are perpendicular to the major surfaces 11a, 11a and opposed to each other, and a top surface 11c and a bottom surface 11d which are perpendicular to the major surfaces 11a, 11a and the lateral surfaces 11b, 11b. The top surface 11c is provided with positive and negative electrodes 11e, 11e.

In the present description, the direction of a line perpendicular to the stacking direction and connecting the top surface 11c and the bottom surface 11d of the power storage cell 11 is defined as the up and down direction, and the direction of a line perpendicular to the stacking direction and connecting the pair of lateral surfaces 11b, 11b of the power storage cell 11 is defined as the right and left direction.

The major surfaces 11a of 12 power storage cells 11, and 11 pieces of rectangular plate-shaped intermediate power storage cell holders 12 composed of synthetic resin are alternately stacked in the stacking direction; a pair of rectangular plate-shaped terminal power storage cell holders 12A, 12B composed of synthetic resin are stacked outwardly of respective ends of two power storage cells 11, 11 in the stacking direction; and a pair of end plates 14A, 14B composed of metal are further stacked outwardly of the terminal power storage cell holders 12A, 12B in the stacking direction. The 11 intermediate power storage cell holders 12 are members that have the same shape and are compatible with each other. The pair of terminal power storage cell holders 12A, 12B have different shapes, and are different in shape from the intermediate power storage cell holders 12.

The power storage module M is assembled by connecting the four corners of the pair of end plates 14A, 14B by upper frames 15, 15 (frame) which are a pair of metal bar members having an L-shaped cross section, and lower frames 16 (frame), 16 which are a pair of metal bar members having an L-shaped cross section after the power storage cells 11, the intermediate power storage cell holders 12, the terminal power storage cell holders 12A, 12B, and the end plates 14A, 14B are stacked in the stacking direction. That is to say, the power storage module M is assembled in the following manner: thick-walled securing portions 15a provided at respective ends of the upper frames 15, 15, and thick-walled securing portions 16a provided at respective ends of the lower frames 16, 16 are made to be in contact with the four corners of the end plates 14A, 14B; and bolts 17, which penetrate through the end plates 14A, 14B, are screwed into the securing portions 15a and 16a.

In the above assembling, upper insulators 18, 18 composed of synthetic resin are disposed between the power storage cells 11, the intermediate power storage cell holders 12, the terminal power storage cell holders 12A, 12B, and the upper frames 15, 15, the upper insulators 18, 18 being configured to prevent liquid junction between the power storage cells 11 and the upper frames 15, 15 via dew condensation water. Similarly, lower insulators 19, 19 composed of synthetic resin are disposed between the power storage cells 11, the intermediate power storage cell holders 12, the terminal power storage cell holders 12A, 12B, and the lower frames 16, 16, the lower insulators 19, 19 being configured to prevent liquid junction between the power storage cells 11 and the lower frames 16, 16 via dew condensation water. In addition, plate springs 20, 20 are disposed between the lower frames 16, 16 and the lower insulators 19, 19, the plate springs 20, 20 being configured to prevent a backlash by pushing upward the bottom surface 11d of each power storage cell 11.

A U-formed bus bar plate 21 is mounted on the upper surface of the power storage module M, and the electrodes 11e of the 12 power storage cells 11 are electrically connected in series by the bus bar plate 21. Thus, one end plate 14A of the pair of end plates 14A, 14B is a high potential side (positive side), and the other end plate 14B is a low potential side (negative side). When a plurality of power storage modules M are connected in series or in parallel, one end plate 14A and the other end plate 14B are given different shapes which are not compatible with each other in order to prevent an assembly error between the high potential side and the low potential side. Manufacturing two types of end plates 14A, 14B having different shapes increases the manufacturing cost, and thus the end plates 14A, 14B are given different shapes by connecting the main plate 22 and the sub-plate 23 in different manners in the present embodiment.

Figure 3:
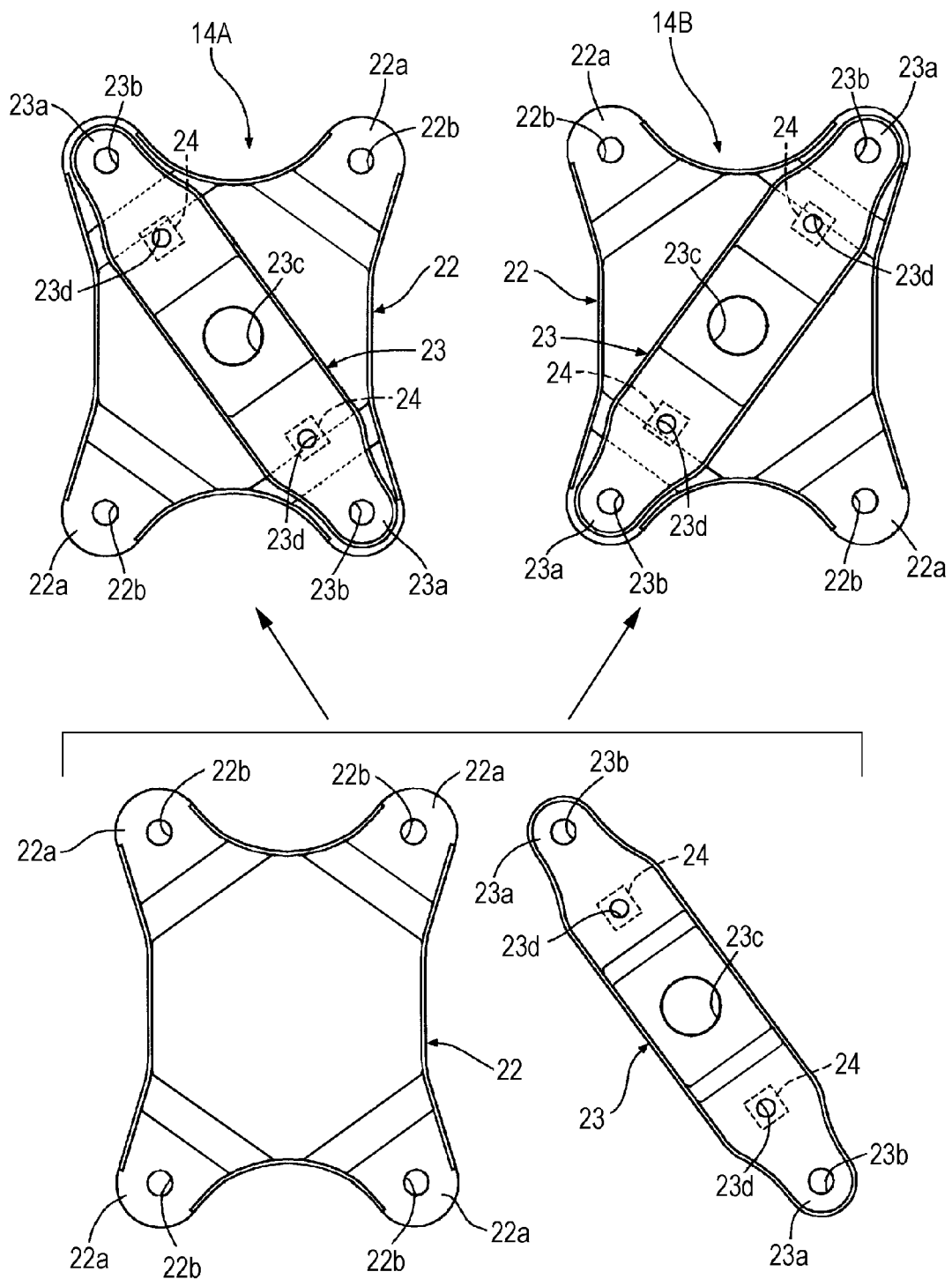
FIG. 3 illustrates the relationship between a main plate, a sub-plate, and an end plate according to the first embodiment.

As illustrated in FIG. 3, the main plate 22 is a substantially rectangular plate member, and projecting frame securing portions 22a at the respective four corners of the main plate 22 are provided with bolt holes 22b. On the other hand, the sub-plate 23 is a substantially linear plate member, and the frame securing portions 23a, 23a at both ends of the sub-plate 23 are provided with bolt holes 23b, 23b, respectively. A jig insertion hole 23c is formed in the central portion of the sub-plate 23, and weld nuts 24, 24 are welded on a rear surface portion of the sub-plate 23, the portion corresponding to a pair of securing holes 23d, 23d which are formed at positions between which the jig insertion hole 23c is present.

The one end plate 14A is formed in the following manner: the sub-plate 23 is aligned with one of two diagonals of the main plate 22, and is secured to the main plate 22 by welding. The other end plate 14B is formed in the following manner: the sub-plate 23 is aligned with the other of the two diagonals of the main plate 22, and is secured to the main plate 22 by welding. The one end plate 14A and the other end plate 14B are distinct members with different shapes having symmetry with respect to a plane, like a right hand and a left hand, and thus an assembly error, which may occur when the power storage modules M are connected in series or in parallel, can be prevented by setting the one end plate 14A to the high potential side, and setting the other end plate 14B to the low potential side.

When the one end plate 14A and the other end plate 14B are assembled by connecting the main plate 22 and the sub-plate 23, five press points a, b, . . . are formed on the main plate 22. One press point in the middle is formed at the center of the jig insertion hole 23c of the sub-plate 23, and four surrounding press points b, . . . are formed at positions outside the sub-plate 23.

Figure 6:
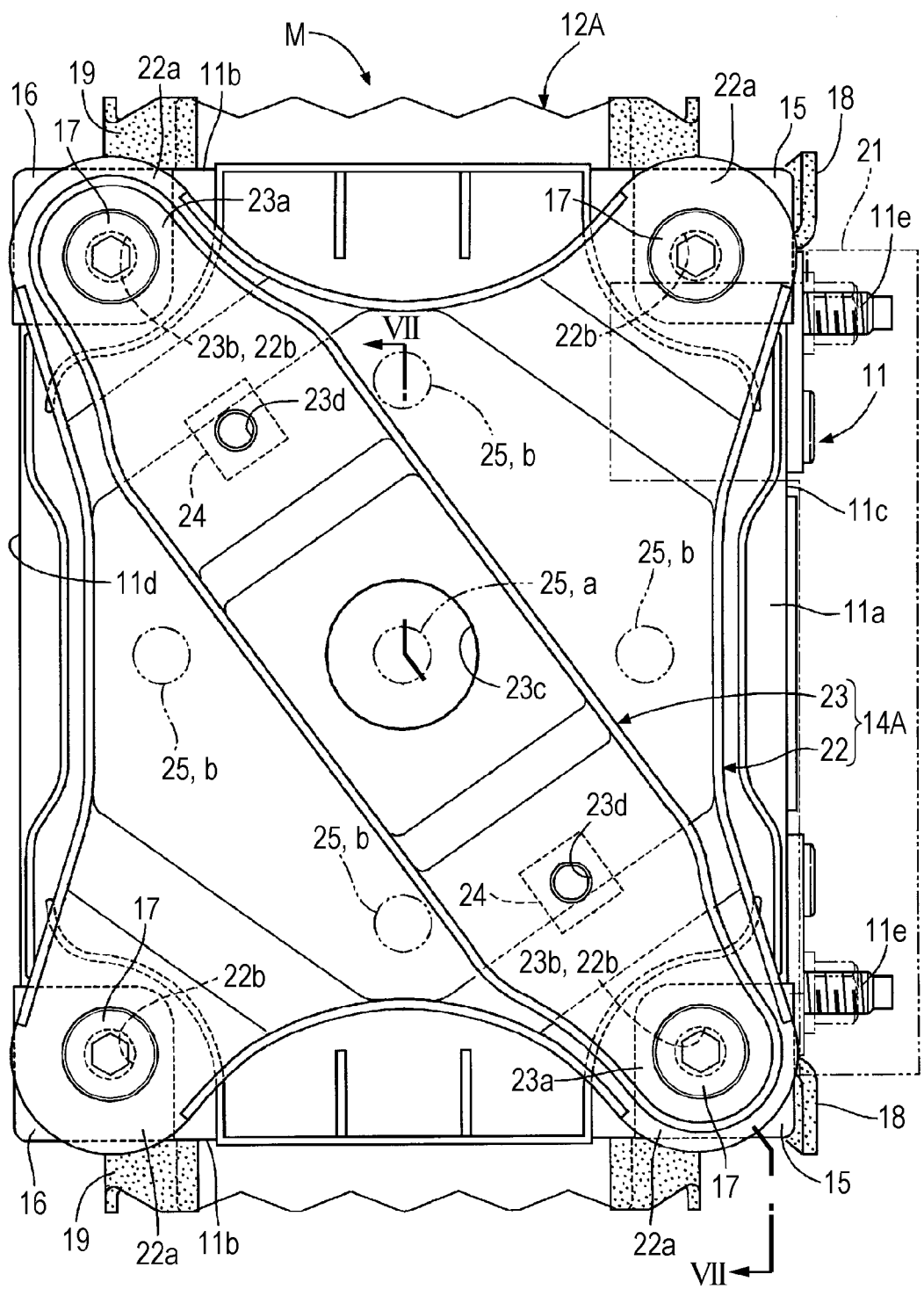
FIG. 6 is an enlarged view of a portion VI in FIG. 5A in the first embodiment.
Figure 7:
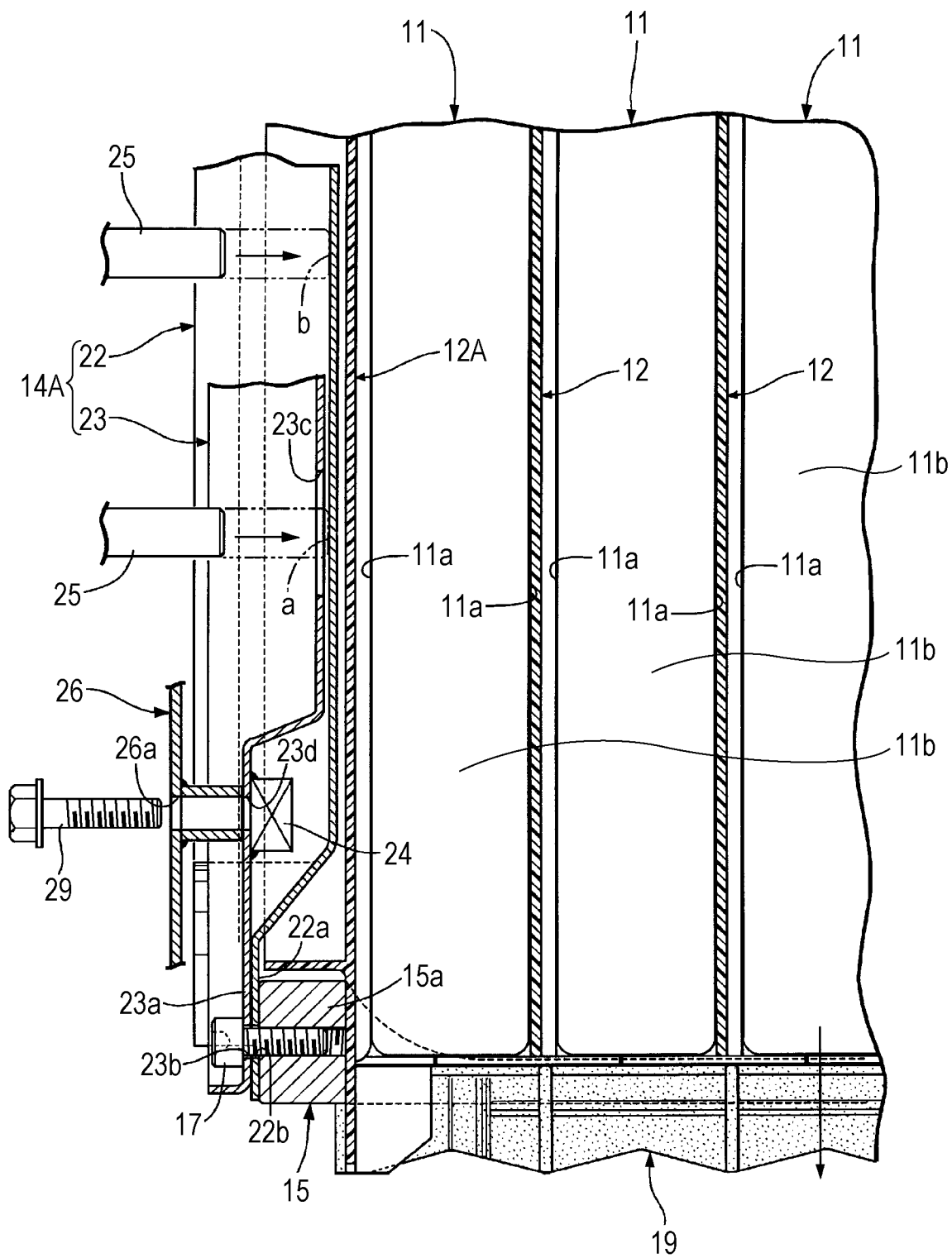
FIG. 7 is a cross-sectional view taken along a line VII-VII in FIG. 6 in the second embodiment.

Thus, the power storage module M is assembled in the following manner: the 12 power storage cells 11 and the 11 intermediate power storage cell holders 12 are alternately stacked; the pair of terminal power storage cell holders 12A, 12B are stacked at respective ends of the stacked power storage cells 11 in the stacking direction; the pair of end plates 14A, 14B are stacked at respective ends of the stacked terminal power storage cell holders 12A, 12B in the stacking direction; as illustrated in FIGS. 6 and 7, five press points a, b, . . . of each of the main plates 22, 22 of the pair of end plates 14A, 14B are pressed in a direction so as to be closer to each other by a pair of jigs each provided with five pressing pins 25; and the power storage cells 11, the terminal power storage cell holders 12A, 12B, and the intermediate power storage cell holders 12 are compressed. Under this condition, the power storage module M is assembled by screwing four bolts 17 into the securing portions 15a, 15a of the upper frames 15, 15, and the securing portions 16a, 16a of the lower frames 16, 16.

In the above assembling, two bolts 17, 17 out of the four bolts 17 penetrate through only the bolt holes 22b, 22b of the main plate 22, however, the other two bolts 17, 17, penetrate through the bolt holes 23b, 23b of the sub-plate 23, as well as the bolt holes 22b, 22b of the main plate 22. Therefore, both the main plate 22 and the sub-plate 23 can be secured together by the other two bolts 17, 17, and thus the strength of the end plates 14A, 14B can be improved. The press point a at the center is pressed by the pressing pin 25 which penetrates through the jig insertion hole 23c which is formed in the sub-plate 23, and thus even when a space is present between the main plate 22 and the sub-plate 23, the press point a of the main plate 22 can be efficiently pressed without causing damage to the sub-plate 23, and the five press points a, b, . . . are arranged in a balanced manner, so that pressing force can be uniformly applied to the press points.

Figure 4:
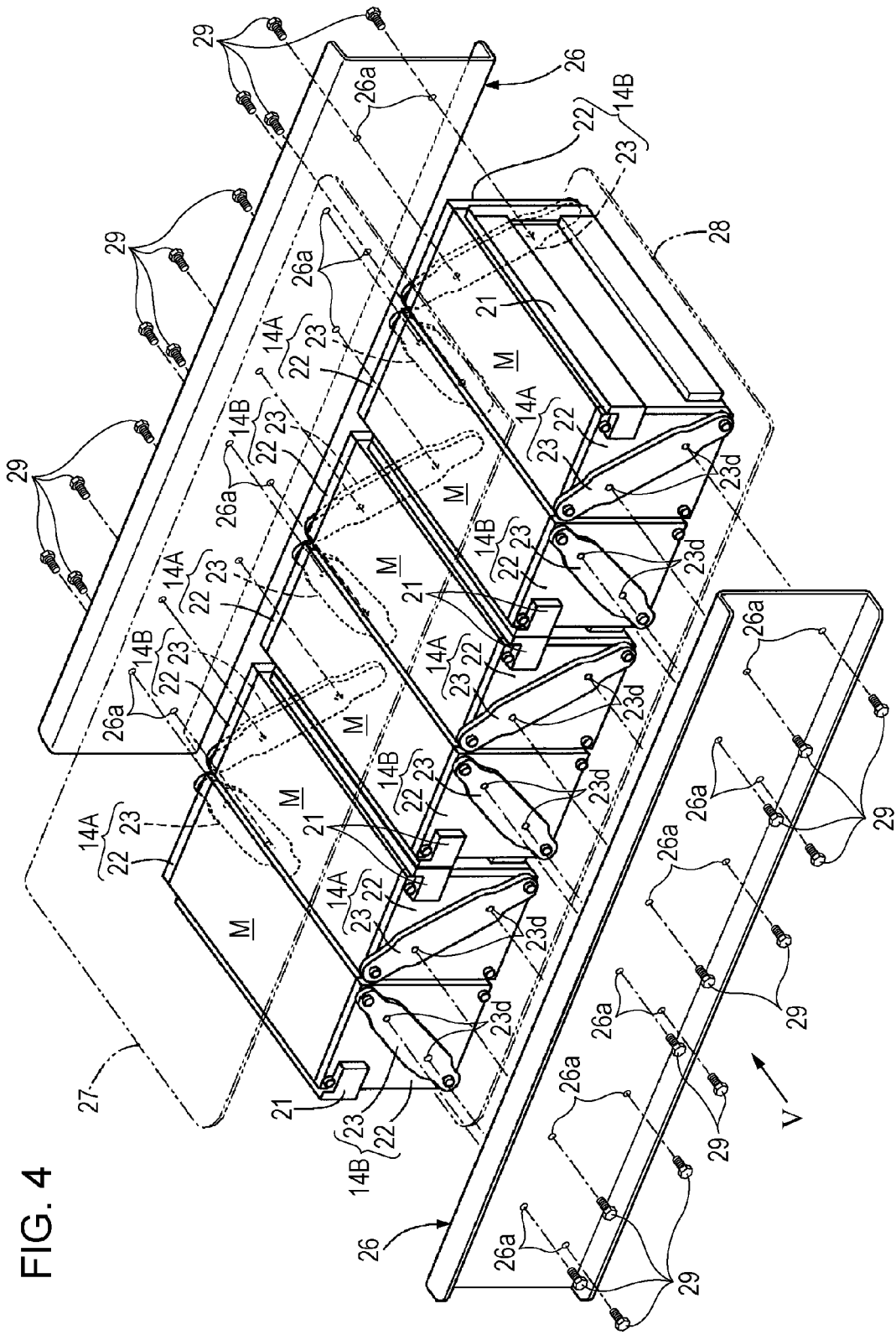
FIG. 4 is an exploded perspective view of a power storage device according to the first embodiment.

As illustrated in FIGS. 4 and 5, a power storage device P is formed by connecting six power storage modules M in series. The power storage device P includes a pair of connecting plates 26, 26, an upper plate 27, and a lower plate 28. The six power storage modules M are disposed side-by-side between the pair of connecting plates 26, 26. The end plates 14A, . . . , 14B, . . . of the six power storage modules M, . . . are then secured to the pair of connecting plates 26, 26 by screwing bolts 29, . . . into the weld nuts 24, . . . on the rear surface of the sub-plate 23, the bolts 29 (first securing member, second securing member) penetrating through the reference securing holes 26, . . . of the connecting plates 26, 26 and the securing holes 23d, . . . of the sub-plate 23. The power storage device P is then assembled by securing the upper plate 27 and the lower plate 28 to the pair of connecting plates 26, 26.

In the above assembling, the six power storage modules M are electrically connected in series, and thus one end plates 14A, . . . and the other end plate 14B, . . . alternately face one of the connecting plates 26 (see FIGS. 5A and 5B). When the power storage module M is mounted sideways in a vehicle, two securing holes 23d, 23d of one (high potential side) of the end plates 14A are diagonally disposed in the upper left direction, two securing holes 23d, 23d of the other (low potential side) of the end plates 14B are diagonally disposed in the upper right direction, the reference securing holes 26a, . . . of the corresponding connecting plates 26, 26 are also diagonally disposed in the upper left or upper right direction, and therefore when the high potential side and the low potential side of a power storage module M are reversed, the power storage module M cannot be attached to the connecting plates 26, 26, and thus an assembly error is reliably prevented.

As described above, in the present embodiment, one end plate 14A and the other end plate 14B having different shapes can be formed by connecting the main plate 22 and the sub-plate 23 which each serves as a common component in a simple shape, thereby reducing the number of types of components to a minimum and contributing to cost reduction.

Second Embodiment

Next, a second embodiment of the present disclosure will be described with reference to FIGS. 8A and 8B.

The power storage device P in the first embodiment is formed by electrically connecting a plurality of power storage modules M in series, whereas a power storage device P in the second embodiment is formed in the following manner: a power storage module pair M' is formed by integrating a pair of power storage modules M, M which are electrically connected in parallel; and a plurality (three in the present embodiment) of the power storage module pairs M', . . . are electrically connected in parallel.

In this case, the high potential sides and the low potential sides of all the power storage modules M are aligned on the same side, and only one end plates 14A, . . . alternately face one of the connecting plates 26, for example. Since the reference securing holes 26a, . . . are previously formed on the connecting plates 26, 26 according to the orientation of the power storage modules M, . . . , no assembly error occurs when the power storage module M is attached to the connecting plates 26, 26 one by one. However, when a power storage module pair M', which is formed by integrating a pair of power storage modules M, M, is attached to the connecting plates 26, 26, an assembly error may occur in a state where a power storage module pair M' is shifted by one pitch as described above.

Nonetheless, an assembly error is prevented by adjusting an arrangement pitch of the reference securing holes 26a, . . . of the connecting plates 26, 26 in the present embodiment. That is to say, an arrangement pitch p of adjacent reference securing holes 26a, . . . within a power storage module pair M', and an arrangement pitch p' of adjacent reference securing holes 26a, . . . in two adjacent power storage module pairs M', M' are set such that p'>p, and thus an assembly error in a state where a power storage module pair M' is shifted by one pitch is reliably prevented.

In the above, the embodiments of the present disclosure have been described. However, various modifications may be made without departing from the spirit of the present disclosure.

For example, the power storage cell 11 in the embodiments is not limited to a lithium-ion battery, and may be another type of battery or capacitor.

The power storage modules M, . . . may be electrically connected to each other in any manner, and may be connected by a combination of serial and parallel connections.

In the embodiments, the main plate 22 and the sub-plate 23 are connected in positional relationships of two types. However, the main plate 22 and the sub-plate 23 may be connected in a positional relationship other than the two types. For example, a plurality of connection patterns may be prepared, so that the power storage modules M can be attached to a plurality of different type vehicles.

A first aspect of the embodiment provides a power storage device including a plurality of power storage modules, each of which having a plurality of power storage cells stacked in a stacking direction and a pair of end plates stacked at respective ends of the power storage cells in the stacking direction; and a pair of connecting plates between which the power storage modules are interposed. A securing hole provided in each of the pair of end plates is aligned with and secured to, by a securing member, a corresponding reference securing hole provided in each of the pair of connecting plates, the pair of end plates includes a main plate which faces the power storage cells, and a sub-plate which has the securing hole and faces the connecting plates, and the main plate and the sub-plate are capable of being connected to each other in at least two positional relationships with different positions of the securing hole. Consequently, the end plate on the high potential side and the end plate on the low potential side are assembled so as to alternately form different shapes, and thus an assembly error in the connecting plate can be prevented. In addition, the end plates having different shapes on the high potential side and the low potential side do not need to be manufactured separately, and thus the manufacturing cost can be reduced.

In addition to the first aspect of the embodiment, a second aspect thereof preferably provides the power storage device further including a frame which connects the pair of end plates together. The main plate is in a rectangular shape, the sub-plate is in a linear shape, the sub-plate is aligned with one of the diagonals of the main plate, and the sub-plate, the main plate, the end plates, and a securing portion of the frame are secured together. Consequently, a securing member for securing the main plate and the sub-plate together, and a securing member for securing the end plates and the frames together may be commonly used so as to reduce the number of components.

In addition to the second aspect of the embodiment, a third aspect thereof preferably provides the power storage device in which the end plates include a plurality of press points, and one of the press points is provided on the main plate outside the sub-plate. Consequently, the process of securing the end plates and the frames together is easily achieved by pressing the pair of end plates and the power storage cells in the stacking direction. Furthermore, the press points are provided on the main plate outside the sub-plate, and thus a pressing force is directly applied to the main plate not via the sub-plate, and the main plate can be effectively pressed while preventing damage to the sub-plate.

In addition to the third aspect of the embodiment, a fourth aspect thereof preferably provides the power storage device in which the main plate has the one of the press points at a position corresponding to a jig insertion hole which is formed in the sub-plate. Consequently, each press point can be set at any position of the main plate without being interfered by the sub-plate.

In addition to the first aspect of the embodiment, a fifth aspect thereof preferably provides the power storage device in which a power storage module pair is formed by electrically connecting two pieces of the power storage module in parallel, a plurality of the power storage module pairs, which are electrically connected in parallel, are disposed between the pair of connecting plates. Thus, an assembly error may occur in a state where a power storage module pair is shifted by one pitch with respect to the connecting plates because the main plate and the sub-plate are connected to each other in the same positional relationship for all the end plates connected to one of the connecting plates. However, an interval between the reference securing holes corresponding to two pieces of the power storage module included in the power storage module pair, and an interval between the reference securing holes corresponding to two adjacent power storage modules of two different power storage module pairs are set to be different from one another. Consequently, an assembly error in a state where a power storage module pair is shifted by one pitch is reliably prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A power storage device comprising:
a plurality of power storage modules, each of the plurality of power storage modules comprising:
  a plurality of power storage cells stacked in a stacking direction;
  a first end plate provided at a first side of the power storage cells in the stacking direction, the first end plate including a first main plate and a first sub-plate, the first main plate facing the first side of the power storage cells, the first sub-plate including a first securing hole, wherein the first main plate and the first sub-plate are connected to each other; and
  a second end plate provided at a second side of the power storage cells in the stacking direction, the second end plate including a second main plate and a second sub-plate, the second main plate facing the second side of the power storage cells, the second sub-plate including a second securing hole;
a first connecting plate including first reference securing holes aligned with the first securing holes of the plurality of power storage modules, the first securing holes of the plurality of power storage modules being secured to the first reference securing holes by first securing members, the first sub-plates of the plurality of power storage modules facing the first connecting plate; and
a second connecting plate including second reference securing holes aligned with the second securing holes of the plurality of power storage modules, the second securing holes of the plurality of power storage modules being secured to the second reference securing holes by second securing members, the power storage modules being provided between the first connecting plate and the second connecting plate, the second sub-plates of the plurality of power storage modules facing the second connecting plate,
wherein the first securing holes extend entirely through the first sub-plates in a direction parallel to the stacking direction of the plurality of power storage cells.

2. A power storage device comprising:
a plurality of power storage modules, each of the plurality of power storage modules comprising:
  a plurality of power storage cells stacked in a stacking direction;
  a first end plate provided at a first side of the power storage cells in the stacking direction, the first end plate including a first main plate and a first sub-plate, the first main plate facing the first side of the power storage cells, the first sub-plate including a first securing hole, wherein the first main plate and the first sub-plate are connected to each other; and
  a second end plate provided at a second side of the power storage cells in the stacking direction, the second end plate including a second main plate and a second sub-plate, the second main plate facing the second side of the power storage cells, the second sub-plate including a second securing hole;
a first connecting plate including a first reference securing hole aligned with the first securing hole, the first securing hole being secured to the first reference securing hole by a first securing member, the first sub-plate facing the first connecting plate;
a second connecting plate including a second reference securing hole aligned with the second securing hole, the second securing hole being secured to the second reference securing hole by a second securing member, the power storage modules being provided between the first connecting plate and the second connecting plate, the second sub-plate facing the second connecting plate; and
a frame connecting the first end plate to second end plate and including a securing portion,
wherein the first securing hole extends entirely through the first sub-plate in a direction parallel to the stacking direction of the plurality of power storage cells,
wherein the first main plate is in a rectangular shape, and the first sub-plate is in a linear shape,
wherein the first sub-plate is aligned diagonally between opposing corners of the rectangular shape of the first main plate, and
wherein the first sub-plate, the first main plate, the first end plate, and the securing portion are secured together.

3. The power storage device according to claim 2,
wherein the first end plate includes a plurality of press points, and
wherein the press points include a first press point provided on the first main plate outside the first sub-plate.

4. The power storage device according to claim 3,
wherein the first sub-plate includes a jig insertion hole, and
wherein the first main plate has a second press point of the press points at a position corresponding to the jig insertion hole.

5. A power storage device comprising:
a plurality of power storage modules, each of the plurality of power storage modules comprising:
  a plurality of power storage cells stacked in a stacking direction;
  a first end plate provided at a first side of the power storage cells in the stacking direction, the first end plate including a first main plate and a first sub-plate, the first main plate facing the first side of the power storage cells, the first sub-plate including a first securing hole, wherein the first main plate and the first sub-plate are connected to each other; and a second end plate provided at a second side of the power storage cells in the stacking direction, the second end plate including a second main plate and a second sub-plate, the second main plate facing the second side of the power storage cells, the second sub-plate including a second securing hole;

a first connecting plate including a first reference securing hole aligned with the first securing hole, the first securing hole being secured to the first reference securing hole by a first securing member, the first sub-plate facing the first connecting plate; and a second connecting plate including a second reference securing hole aligned with the second securing hole, the second securing hole being secured to the second reference securing hole by a second securing member, the power storage modules being provided between the first connecting plate and the second connecting plate, the second sub-plate facing the second connecting plate, wherein the first securing hole extends entirely through the first sub-plate in a direction parallel to the stacking direction of the plurality of power storage cells, wherein two of the power storage modules is electrically connected in parallel to each other to provide each of power storage module pairs, wherein the power storage module pairs are electrically connected in parallel to each other and are disposed between the first connecting plate and the second connecting plate, and wherein an interval between the first reference securing holes corresponding to two pieces of the power storage module included in the power storage module pair is set to be different from an interval between the first reference securing holes corresponding to two adjacent power storage modules of two different power storage module pairs.

6. The power storage device according to claim 1, wherein the first main plate and the first sub-plate are provided to be connected to each other in at least two positional relationships with different positions of the first securing hole, and wherein the second main plate and the second sub-plate are provided to be connected to each other in at least two positional relationships with different positions of the second securing hole.

7. The power storage device according to claim 1, wherein the first connecting plate overlaps with the first sub-plate when viewed in the stacking direction.

8. The power storage device according to claim 1, wherein the first connecting plate overlaps with the first securing hole when viewed in the stacking direction.

* * * * *